United States Patent
Moore

(10) Patent No.: US 7,106,026 B2
(45) Date of Patent: Sep. 12, 2006

(54) METHOD OF DYNAMICALLY CHARGING A BATTERY USING LOAD PROFILE PARAMETERS

(75) Inventor: Stephen W. Moore, Fishers, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 265 days.

(21) Appl. No.: 10/657,905

(22) Filed: Sep. 9, 2003

(65) Prior Publication Data

US 2005/0052185 A1    Mar. 10, 2005

(51) Int. Cl.
*H01M 10/44* (2006.01)
*H01M 10/46* (2006.01)

(52) U.S. Cl. .................................... 320/104
(58) Field of Classification Search ............... 320/101, 320/104, 128, 134, 136
See application file for complete search history.

(56) References Cited

U.S. PATENT DOCUMENTS

| | | | |
|---|---|---|---|
| 6,083,912 A | | 7/2000 | Khouri |
| 6,091,229 A | * | 7/2000 | Oglesbee et al. ........... 320/137 |
| 6,218,804 B1 | * | 4/2001 | Toriyama et al. ........... 320/104 |
| 6,291,097 B1 | | 9/2001 | Barker et al. |
| 6,394,208 B1 | | 5/2002 | Hampo et al. ............. 180/65.2 |
| 6,406,815 B1 | | 6/2002 | Sandberg et al. |
| 6,413,668 B1 | | 7/2002 | Sandberg et al. |
| 6,419,712 B1 | | 7/2002 | Haverstick |
| 6,456,042 B1 | | 9/2002 | Kwok |
| 6,612,246 B1 | * | 9/2003 | Kumar ....................... 320/101 |
| 6,617,078 B1 | | 9/2003 | Chia et al. |
| 6,836,097 B1 | * | 12/2004 | Turner et al. ............... 320/166 |

* cited by examiner

*Primary Examiner*—Edward H. Tso
(74) *Attorney, Agent, or Firm*—Howard & Howard

(57) ABSTRACT

An energy system is formed of a plurality of battery cells, and has an application associated therewith that draws power from the energy system, thereby creating a load profile that is presented to the energy system. As the application is being used, voltage and current measurements are taken at a predetermined rate, and stored in a history table to create a series of time-based measurements. The measurements stored in the history table are then processed to produce an energy spectra and a power spectra corresponding to the load profile presented to the energy system by the application. A charging strategy in accordance with this energy spectra and power spectra is then defined and used to charge the energy system appropriately.

23 Claims, 3 Drawing Sheets

METHOD OF DYNAMICALLY CHARGING A BATTERY USING LOAD PROFILE PARAMETERS

TECHNICAL FIELD

The invention relates generally to energy-based systems, and in particular to a method of operating these systems.

BACKGROUND OF THE INVENTION

It is known in many applications, including self-propelled vehicle applications as seen by reference to U.S. Pat. No. 6,394,208 entitled "STARTER/ALTERNATOR CONTROL STRATEGY TO ENHANCE DRIVEABILITY OF A LOW STORAGE REQUIREMENT HYBRID ELECTRIC VEHICLE" issued to Hampo et al., to employ a dynamoelectric machine in a first mode as a motor in order to provide propulsion torque. In such applications, it is also known to reconfigure the dynamoelectric machine in a second mode as a generator, in order to capture and convert some of the potential or kinetic energy associated with the application into output electrical power, a process known as regeneration ("regenerative energy"). Moreover, in such applications, it is also known to provide an energy system, such as a battery, to power the dynamoelectric machine when operated as a motor, and to receive the regenerative energy when the dynamoelectric machine is operated as a generator. In the latter case, the regenerative energy is generally operative to increase the state of charge of the battery, until such battery is "fully" charged. Battery technologies typically used in such applications include nickel metal hydride (NiMH), lead acid (PbA) and nickel cadmium (NiCd) technologies, although energy systems employing lithium chemistry technologies, while not as prevalent as other battery technologies, are also used in practice.

One aspect of the above systems that involves tradeoffs or compromises pertains to optimizing the utilization of the energy system through charging regimens. Energy systems can be presented with at least two different types of load profiles by associated applications. One such type is "energy-based," which means that the load profile produced by the application is substantially constant. An example of this type of load profile would be an energy system associated with an automobile that is operated fairly constantly on an open highway where the operator is not accelerating or decelerating rapidly. This type of operation does not utilize a lot of power, rather it uses more energy. Another type of load profile is a "power-based" load profile, which means that the application with which the energy system is associated is presenting a more dynamic load profile to the energy system. An example of this type of load profile would be an energy system associated in an automobile where the operator is accelerating and decelerating quickly, requiring more power to be used. Presently, most optimization is done in the design phase of the energy system, as opposed to "real time" optimization done while the energy system is "live" in operation, by implementing fixed routines where "expected" customer load profiles are developed, and the energy system is designed around these expected cycles. With respect to energy systems comprised of lithium chemistry technologies, fixed energy-based balancing methods are utilized in an effort to maximize performance for energy-based applications and load profiles, however, no provisions are made to account for more power-based applications.

These existing methods, while adequate, do not allow for the most useful method of optimization. Existing methods, as set forth above, neither provide for "real time" adaptation of the charging regimen to the energy system while it is "live" in operation, nor take into account the varied applications that may be presented to an energy system. For example, while it would generally be desirable to charge the battery to its highest possible state of charge for more constant, energy-based applications presented to the energy system (which in turn would provide the greatest range or longest duration use for the application running off the battery), such an approach is generally not considered optimal for more dynamic, power-based applications. For smooth or constant, energy-based applications, the system operator will want the energy system to be charged to the highest possible state of charge in order to allow for the longest duration of use. However, for dynamic, power-based applications, where the application operator wants big surges of power as opposed to large amounts of energy for constant, smooth use, he may want to charge the energy system to a lower percentage state of charge (i.e., 50% state of charge), thereby optimizing the systems power level to allow for more power in and out of the system.

There is, therefore, a need for a process that allows the energy system to self-learn the type of application that it is being presented, and to then determine a charging strategy that will minimize or eliminate one or more of the above-identified problems.

SUMMARY OF THE INVENTION

An object of the present invention is to solve one or more of the problems as set forth above. One advantage of the present invention is that the energy system, which may be formed of a fuel cell or any bi-directional energy storage devices such as lithium chemistry technologies, is able to continuously self-learn its operating trends in "real time," thereby allowing it to tune itself to optimize performance either while the energy system is "live" in operation, or while the system is "off-line." The present invention allows the system to adapt itself to whatever type of load profile, whether it be of a more constant, energy-based nature, or of a more dynamic, power based nature that is presented to it by an associated application. This allows the system to then adapt a charging strategy that is appropriate for that given load profile. The continuous adaptation to the performance of the energy system as presented in this invention allows for performance of the energy system to be optimized and extracted beyond what is normally expected.

Another advantage is that the measurements made in accordance with the present invention are done so in real-time as the system is live in operation without requiring any additional monitoring circuitry, or any user interaction.

These and other features, objects, and advantages are realized by the present invention, which includes a method of operating an energy system. The method includes measuring the electrical characteristics of power (i.e., current and voltage) drawn by an application coupled to the energy system, and storing these measurements in a memory to create a running series of time-based measurements. The method further includes processing the measured electrical characteristics stored in the memory to produce an energy spectra and a power spectra of the load profile presented by the application to the energy system, and then adjusting the charging strategy of the energy system in accordance with the energy spectra and power spectra.

An energy system according to the invention is also presented.

BRIEF DESCRIPTION OF THE DRAWINGS

The present invention will now be described by way of example, with reference to the accompanying drawings.

DESCRIPTION OF PREFERRED EMBODIMENT

Figure 1:
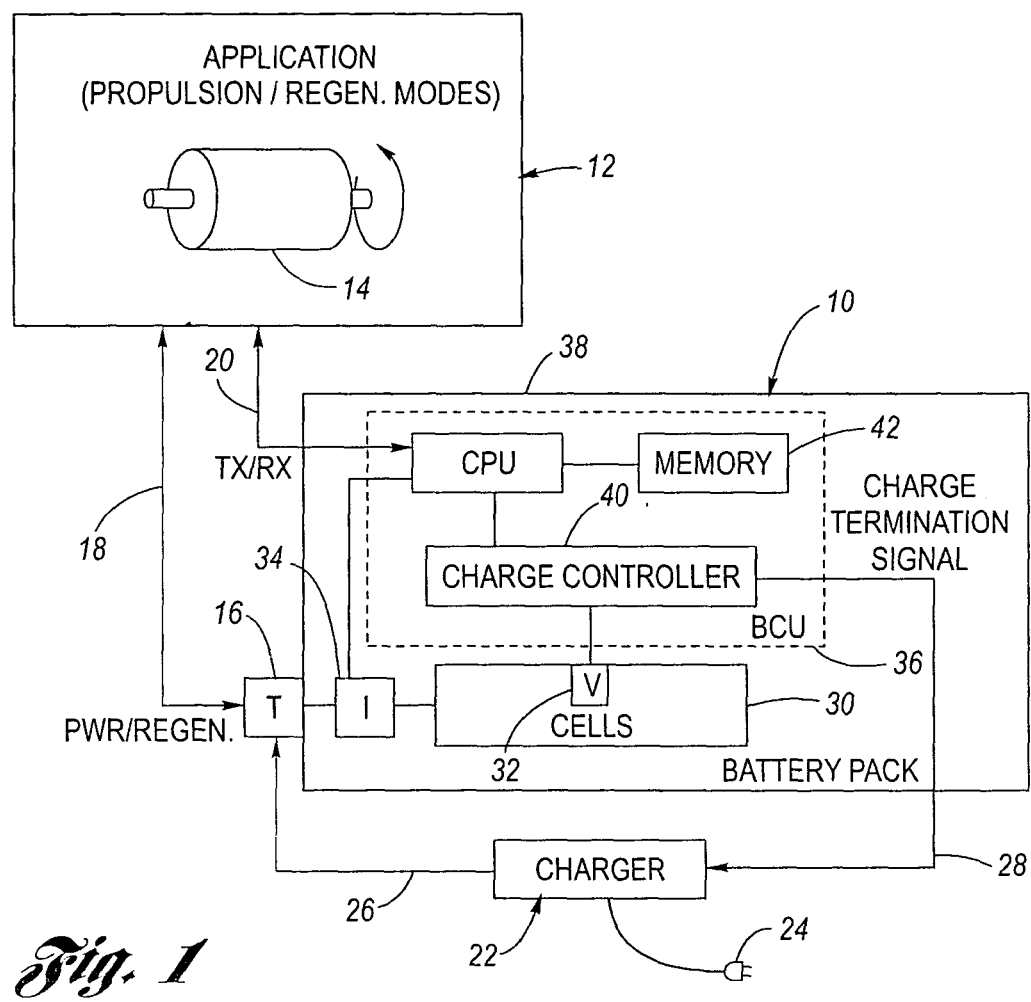
FIG. 1 is a simplified schematic and block diagram view of an energy system according the present invention, in an exemplary embodiment.

Referring now to the drawings wherein like reference numerals are used to identify identical components in the various views, FIG. 1 is a simplified, schematic and block diagram view of an inventive energy system 10 according to the invention suitable for use in connection with any one or more of a plurality of exemplary applications 12. Application 12, in the illustrated embodiment, may be of the type employing a dynamoelectric machine 14, which may alternatively be configured for operation (i) in a first mode wherein the machine 14 is used for propulsion torque, or (ii) in a second mode different from the first mode wherein the machine 14 is configured for the production of regenerative energy (i.e., it is configured as a generator). For example, such applications may include, but are not limited to, self-propelled vehicle applications, although other application stationary in nature (i.e., rotating systems having loads with inertia) are also included within the spirit and scope of the invention. Dynamoelectric machine 14 may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature.

Energy system 10 includes a means for measuring and analyzing predetermined electrical characteristics of power, such as voltage and current, drawn by application 12 from energy system 10 as a function of time. Energy system 10 further includes a means for using such measurements and analysis to allow energy system 10 to both "self-learn" the type of load profile presented to it by application 12, and to determine a charging strategy in accordance with that particular load profile. The present invention is, therefore, adapted to establish a way for energy system 10 to maximize performance by continuously adapting its charging regimen to the particular type of load profile, whether energy-based or power-based, being presented to it, as opposed to utilizing fixed routines. By utilizing the functionality of this invention, users of energy system 10 are thereby able to extract optimal performance from energy system 10 that is otherwise unattainable.

With continued reference to FIG. 1, energy system 10 may include an input/output terminal 16, designated "T" (for Terminal) in the drawings. A power bus 18, designated "PWR/REGEN." in the drawings, is configured to allow electrical power to be drawn for energy system 10 when dynamoelectric machine 14 is operated in a first, propulsion torque mode. Power bus 18 alternatively may be configured or used to carry electric energy, hereinafter referred to as regenerative energy, produced by dynamoelectric machine 14 when operated in the second, regenerative energy production mode (as a generator). As further shown, in the illustrated embodiment, energy system 10 may also include a communications port configured for connection to a communications line 20, designated "TX/RX" (transmit/receive) in FIG. 1. Communications line 20 may be configured for bi-directional communications, for example control signals or control messages, between energy system 10 and application 12.

FIG. 1 also shows an electrical battery charger 22, including in exemplary fashion a conventional electrical plug 24 for connection to a wall outlet (not shown) or the like. Charger 22 is configured for charging (or recharging) energy system 10. Charger 22 includes a charging power line 26 configured for connection to energy system 10 for charging (or recharging) the storage devices making up energy system 10, although for simplicity sake, line 26 is shown connected to the I/O terminal 16 (PWR/REGEN.). In addition, charger 22 may have an input configured to receive a control signal, such as a charge termination signal, on a control line 28 from energy system 10. The charge termination signal on line 28 is configured to cause charger 22 to discontinue charging energy system 10 (i.e., to stop charging), for example, when the energy system 10 has been charged to a calculated level according to the invention, as described in greater detail below. Alternatively, charger 22 may be a variable charger 22 wherein the control signal on line 28 is operative to adjust the charging current as well as to terminate the charge current. Charger 22 may comprise conventional charging componentry known to those of ordinary skill in the art.

In the illustrated embodiment, energy system 10 includes one or more battery cells 30, at least one voltage monitoring device 32, at least one current monitoring device 34 and an Battery Control Unit (BCU) 36. BCU 36 may include a central processing unit (CPU) 38, a charge controller 40, and a memory 42.

Cells 30 are configured to produce electrical power, and may be arranged so that the collective output thereof is provided on I/O terminal 16, as in the illustrated embodiment. Conventional electrical current flows out of terminal 16 to the load (i.e., the dynamoelectric machine 14) in application 12. Cells 30 are also configured to be rechargeable, for example, by receiving conventional electrical current into energy system 10 at I/O terminal 16. The recharging current may be from either charger 22 or from machine 14 operating as a generator. Cells 30 may comprise conventional apparatus according to known bi-directional energy storage systems, such as the battery technologies described in the Background, for example, NiMH, PbA, or NiCd, or the like. Cells 30 may also comprise electrical generation devices such as fuel cells. In a preferred embodiment, however, cells 30 comprise cells formed in accordance with various Lithium chemistries known to those of ordinary skill in the energy storage art. In the illustrated embodiment, cells 30 are arranged to produce a direct current (DC) output at a predetermined, nominal level (e.g., 80 volts at 100% of full state of charge).

Voltage monitoring device 32 is configured to measure the voltage level being drawn by application 12 from energy system 10, and to produce a voltage indicative signal representative of the detected voltage. In one embodiment, one voltage monitoring device 32 is provided to detect the overall voltage output of the combination of cells 30. In a preferred embodiment, however, a plurality of voltage monitoring devices 32 (the plurality not being shown for clarity) are employed, at least one for each individual cell included in energy system 10. Voltage monitoring device(s) 32 may comprise conventional apparatus known in the art.

Current monitoring device 34 is configured to detect the current level being drawn by application 12 from energy system 10, and to generate, in response, a current indicative signal representative of the measured current level. Current monitoring device 34 may comprise conventional apparatus known in the art.

Battery Control Unit (BCU) 36 is configured for controlling the overall operation of energy system 10, including the adjustments to the charging strategy according to the invention. BCU 36 may include a central processing unit (CPU) 38, a charge controller 40, and a memory 42.

CPU 38 may comprise conventional processing apparatus known in the art, capable of executing preprogrammed instructions stored in memory 42, all in accordance with the functionality as described in greater detail below. In this regard, memory 42 is coupled to CPU 38, and may comprise conventional memory devices, for example, a suitable combination of volatile, and non-volatile memory so that main line software can be stored and further allow processing of dynamically produced data and/or signals.

Figure 2:
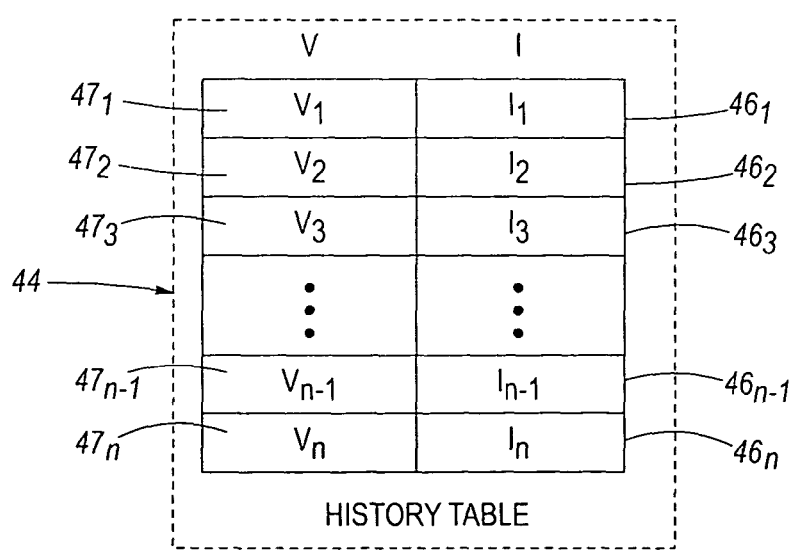
FIG. 2 is a diagrammatic view showing, in greater detail, a table portion of the memory shown in FIG. 1.

FIG. 2 shows a data structure, namely, a history table 44, which is configured to store a plurality of voltage measurements $V_1, V_2, V_3, \ldots, V_{(n-1)}, V_n$, respectively designated $46_1, 46_2, 46_3, \ldots, 46_{(n-1)}, 46_n$; and a plurality of current measurements $I_1, I_2, I_3, \ldots, I_{(n-1)}, I_n$, respectively designated $47_1, 47_2, 47_3, \ldots, 47_{(n-1)}, 47_n$. The history table 44 is a mechanism through which a series of time-based voltage and current measurements can be recorded and stored. In one embodiment, history table 44 comprises a First In, First Out (FIFO) buffer having a finite length (e.g., 6 entries, 8 entries, 10 entries, etc.). The length of the buffer may be selected to reflect the responsiveness of the method changes. Each entry corresponds to the respective time-based voltage and current measurements taken by voltage monitoring device 32 and current monitoring device 34 over a period of time. It should be understood, however, that other approaches are possible and yet remain within the spirit and scope of the present invention.

Figure 3:
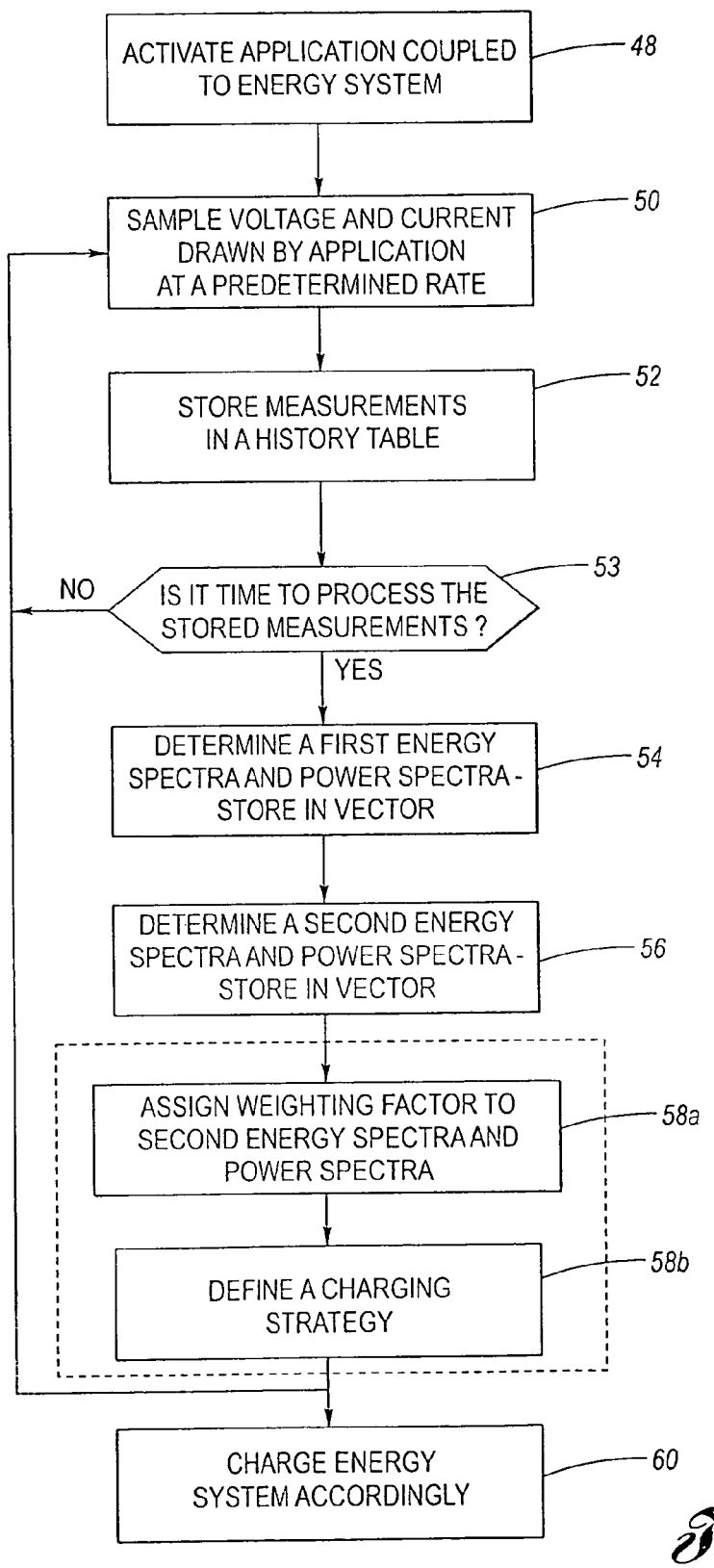
FIG. 3 is a flowchart diagram illustrating a method in accordance with the present invention.

Referring now to FIGS. 1–3, a method in accordance with the present invention will now be set forth. It should be understood that the following functionality, unless specifically described with respect to a particular structure of the illustrated embodiment of FIG. 1, or which has already been specifically described in connection with a specific structure of FIG. 1, may be implemented in software suitable for execution by CPU 38.

Referring specifically to FIG. 3, in step 48, application 12 is activated. This may include operating a hybrid vehicle or an electric vehicle, however, these applications are merely exemplary and the invention is not so limited.

In step 50, voltage monitoring device 32 and current monitoring device 34 sample the voltage and current being drawn by application 12 from energy system 10 at a predetermined time rate. This is an iterative step in the method that results in the accumulation of a series of time-based measurements.

In step 52, these measurements are stored in history table 44 as they are taken, and designated accordingly (i.e., $V_1$, $V_2$, etc . . . and $I_1$, $I_2$, etc . . . ). It should be appreciated that on the first loop through steps 50–52, history table 44 only contains one set of voltage and current measurements. However, through subsequent sampling of the power drawn by application 12, history table 44 will become fully populated. In one embodiment, the earliest measurements in history table 44 will be pushed out and discarded. This particular implementation has the effect of "time" filtering out "old" voltage and current measurements.

In step 53, CPU 38 determines whether it is time to process the stored measurements. If it is, then the method branches to step 54 wherein the measurements are processed and the first energy spectra and first power spectra are determined. Otherwise, the method branches to step 50 wherein further samples are taken. The criteria for determining when the samples are processed may include a time interval (e.g., process every x milliseconds) or may be based on other criteria (e.g., history table 44 is full). A comparison of the values of these two spectra allows for the balance between the energy and the power of the load profile presented to energy system 10 by application 12 to be expressed as a single number. This single number allows energy system 10 to then detect whether the load profile presented by application 12 is energy-based or power based. For example, if a comparison of the energy spectra value and the power spectra value results in a number of 0, then the application is purely energy-based. On the other hand, if a comparison of the values associated with the energy and power spectras results in a number of 100, then the application is purely power-based. Anything in between 0 and 100 means that there is a mix of energy and power, and depending on the side of 50 that the number falls on determines whether it is more energy or more power based. It should be noted, however, that these examples are simply exemplary and not limiting in nature.

Figure 4:
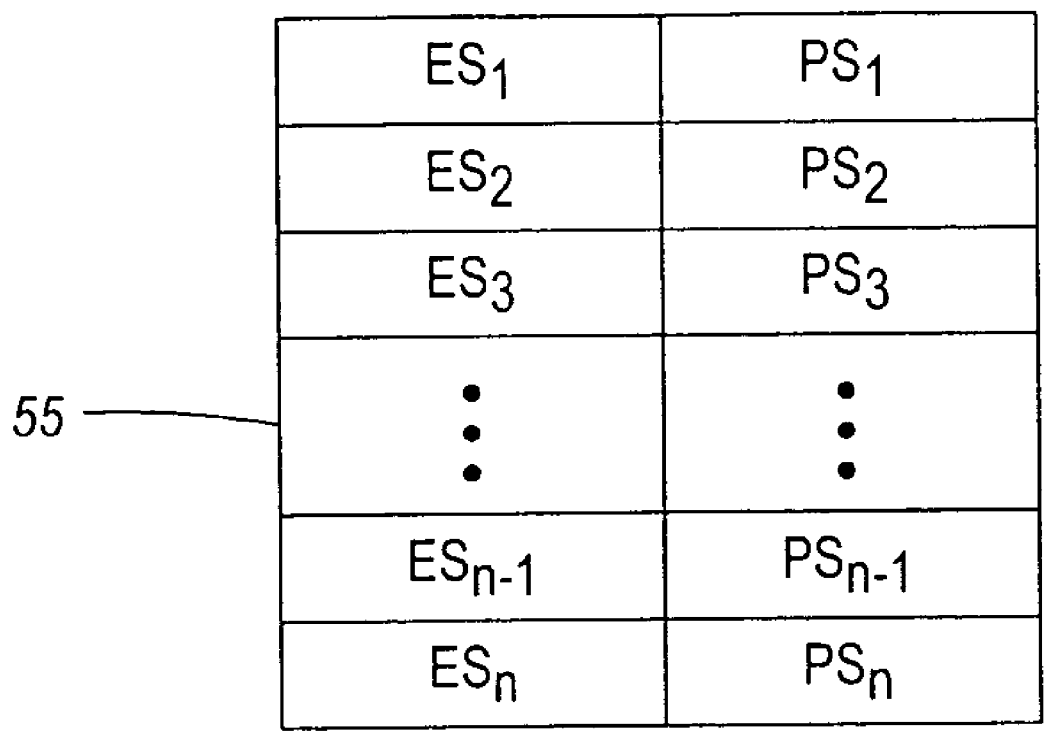
FIG. 4 is a diagrammatic view showing, in greater detail, a vector used for storing calculations in accordance with the present invention.

The first power spectra and first energy spectra can be determined in a number of ways. In one approach the applicable voltage and current measurements stored in history table 44 are processed using a least squares algorithm as known in the art to determine the slope and intercept of the particular measurements. The computed slope is interpreted as the power spectra of energy system 10, and the computed intercept is interpreted as the energy spectra of energy system 10. The resulting values of this calculation are then stored in a vector 55, and designated in the vector as $ES_1$ and $PS_1$, as shown in FIG. 4. This is an iterative step that results in a series of energy spectra and power spectra pairings being stored in vector 55. As with history table 44, it should be appreciated that on the first loop through steps 50–54, vector 55 only contains one energy spectra and one power specta. However, through subsequent measurements and calculations, vector 55 will become fully populated, as shown in FIG. 4. In one embodiment, the earliest measurements in vector 55 will be pushed out and discarded. This particular implementation has the effect of "time" filtering out "old" energy spectra and power spectra.

In a different approach, the voltage and current measurements stored in history table 44 are provided to a neural network with embedded delays, which then computes the average power and energy requirements of the load, profile, resulting in the creation of an energy spectra and a power spectra. There are a wide variety of known, neural network implementations that can be used in the present invention. It should be noted, however, that these approaches are exemplary and are not meant to be limiting in nature.

In step 56, a second power spectra and energy spectra are determined in the same manner as the first power and energy spectras in step 54, except that they are calculated using a second series of time-based measurements. Like the first energy spectra and power spectras defined in step 54, these second energy and power spectras are representative of the load profile that application 12 is presenting to energy system 10, and they are also stored in vector 55, designated as $ES_2$ and $PS_2$ as shown in FIG. 4.

In step 58, these first and second energy and power spectras that are defined in steps 54 and 56 are used to define a charging strategy for energy system 10. This is accomplished in step 58a by first determining a weighting factor to be assigned to the second energy and power spectras by taking into account the first energy spectra and power spectra and the plurality of other previously determined energy spectra and power spectra stored in vector 55. The next substep, step 58*b*, is assigning the weighting factor to the second energy spectra and power spectra. A charging strategy can then be defined based on the product of the second energy spectra and power spectra and the weighting factor. The strategy can then be used to adapt the appropriate charging regimen to the load profiles presented to energy system 10.

In step 60, the energy system is charged in accordance with the charging strategy defined in step 58. This charging routine may take the form of using conventional external chargers 22, as discussed above and shown in FIG. 1, which would entail ceasing use of the energy system, "plugging" charger 22 into energy system 10, and then charging energy system 10 pursuant to the defined charging strategy. The charging routine could also take the form of "real-time" regenerative recharging which would allow for the charging of energy system 10 as it is live in operation, without discontinuing use. Regardless of the mechanism chosen to carry out the charging routine, the charging strategy is determined in the same manner, and presented to the chosen mechanism in the same way.

Whether the load profile presented to energy system 10 is constant, energy-based, or more dynamic, power-based will determine what charging strategy will be carried out. For example, if the load profile presented to the energy system 10 is determined to be energy-based or constant, then the charging strategy will be adjusted to allow for the energy system 10 to be charged to a maximum level. However, if the load profile is determined to be more power-based or dynamic, then the charging strategy will be such that the charging will be backed off to allow for maximum headroom for optimizied power in and out of the system.

While this method has been described with respect to an overall output voltage of the energy system 10, in an alternate embodiment, this method can be carried out with respect to an individual storage device(s) of the energy system. In particular, energy system 10 may include a plurality of battery cells 30. The charging of each cell, for example in a lithium chemistry battery pack, is controlled. It should therefore be understood that one cell in the battery pack may be at a higher voltage than the others wherein the whole charging process is terminated when the limits in the charging strategy have been reached for that particular cell. Thus, the charging strategy should be understood to apply to either the overall output voltage of the battery pack, or, the one or more particular cells within the battery pack, or some combination of the foregoing, all as the circumstances of the particular battery pack and cells (i.e., battery technology, charging capability, etc.) being used may require.

In accordance with the present invention, an energy system formed of lithium chemistry technologies is coupled to an application which draws power from the energy system. While the application is in use, the voltage and current being drawn from the energy system by the application are sampled at a predetermined rate. These measurements are then stored in a history table within the energy system, and are used to create a running series of time-based measurements. A first series of these measurements are then processed in order to determine an energy spectra and a power spectra of the application's load profile presented to the energy system. This allows the energy system to determine whether the application is using the energy system in an energy-based or a power-based manner. Similarly, a second series of time-based measurements are then processed to define a second energy spectra and power spectra corresponding to the second series of time-based measurements. A weighting factor is then determined and assigned to the second energy spectra and power spectra, and then a charging strategy is defined based on the products of the second energy spectra and power spectra and the weighting factor. This strategy is then implemented using a charging system.

The invention claimed is:

1. A method for operating an energy system, comprising the steps of:
   providing an application coupled to the energy system, said application comprising a dynamoelectric machine;
   measuring electrical characteristics of power drawn comprising voltage and current drawn by the application from the energy system as a function of time to create running series of time-based measurements;
   processing the measured electrical characteristics to produce an energy spectra and a power spectra of a load profile presented by the application to the energy system; and
   dynamically charging the energy system based on the energy spectra and the power spectra to a state of charge which is less than a maximum state of charge to provide headroom to permit said energy system to receive regenerative energy from said dynamoelectric machine.

2. The method of claim 1 wherein the measuring step includes the substeps of:
   sampling the electrical characteristics at a predetermined rate to produce a series of time-based measurements; and
   storing the series of measurements in a table.

3. The method of claim 1 wherein the step of providing an application coupled to the energy system further includes the step of forming an energy system so as to include a battery comprised of a plurality of cells.

4. The method of claim 3 wherein the forming step is performed by the substep of producing the plurality of cells so as to employ lithium chemistry salts.

5. The method of claim 2 wherein said measuring step includes the substeps of:
   selecting the electrical characteristics sampled in said sampling step from the group comprising a voltage level and a current level; and
   sampling the voltage and current levels.

6. The method of claim 2 wherein the processing step further includes the substeps of:
   determining a first energy spectra from the series of time-based measurements using a first predetermined criteria;
   determining a first power spectra from the series of time-based measurements using a second predetermined criteria; and
   storing the energy spectra and the power spectra in a vector.

7. The method of claim 6 wherein the series of time-based measurements is a first time series and the load profile is a first profile, wherein said processing step further includes the substeps of:
   computing a second energy spectra and a second power spectra using a second series of time-based measurements different than said first series; and
   storing the second energy spectra and the second power spectra in the vector.

8. The method of claim 7 wherein said charging step further includes the substep of:
   determining a weighting factor for the second energy spectra and power spectra using the first energy spectra and power spectra, as well as a plurality of previously determined energy spectra and power spectra stored in the vector;

assigning the weighting factor to second energy spectra and power spectra; and defining a charging strategy based on the products of the second energy spectra and power spectra and the weighting factor.

9. The method of claim 6 wherein said step of determining said first power and energy spectra step further includes the substep of:

applying a least squares algorithm to said series of time-based measurements.

10. The method of claim 6 wherein said step of determining said first power and energy spectra further includes the substeps of:

providing a neural network;

storing said series of time-based measurements in said neural network; and computing the average energy and power requirements of said series of time-based measurements stored in said neural network.

11. A method of operating an energy system comprising the steps of:

providing an application containing a dynamoelectric machine coupled to the energy system;

operating the dynamoelectric machine whereby power is drawn from the energy system;

measuring the voltage and current drawn by the dynamoelectric machine from the energy system as a function of time;

sampling the electrical characteristics at a predetermined rate to thereby produce a series of time-based measurements;

storing the series of measurements in a table;

processing the measured voltage and current to produce an energy spectra using a first predetermined criteria, and a power spectra using a second predetermined criteria;

storing the energy spectra and power spectra in a vector; and dynamically charging the energy system using the energy spectra and power spectra to a state of charge which is less than a maximum state of charge to provide headroom to permit said energy system to receive regenerative energy from said dynamoelectric machine.

12. The method of claim 11 wherein the step of providing an application containing a dynamoelectric machine coupled to the energy system further includes the step of forming the energy system so as to include a battery comprising a plurality of cells.

13. The method of claim 12 wherein the forming step is performed by the substep of producing the plurality of cells so as to employ lithium chemistry salts.

14. The method of claim 11 wherein die measuring step further includes measuring the voltage and current simultaneously.

15. The method of claim 11 wherein the series of time-based measurements is a first time series and the energy spectra and power spectra are a first energy spectra and a first power spectra, wherein said processing step further includes the substeps of:

computing a second energy spectra and a second power spectra using a second series of time-based measurements different than said first series; and storing the second energy spectra and power spectra in the vector.

16. The method of claim 15 wherein said charging step further includes the substeps of:

determining a weighting factor for the second energy spectra and power spectra using the first energy spectra and power spectra, as well as a plurality of previously determined energy spectra and power spectra stored in the vector;

assigning the weighting factor to the second energy spectra and power spectra; and defining a charging strategy based on the product of the second energy spectra and power spectra and the weighting factor.

17. The method of claim 11 wherein said step of determining said first power and energy spectra further includes the substep of:

applying a least squares algorithm to said series of time-based measurements.

18. The method of claim 11 wherein said step of determining said first power and energy spectra further includes the substeps of:

providing a neural network;

presenting said series of time-based measurements to said neural network; and computing the average energy and power requirements of said series of time-based measurements presented to said neural network.

19. An energy system comprising:

at least one energy storage device to produce electrical power on a terminal thereof;

a means for measuring electrical characteristics of power drawn from the energy system by an application comprising a dynamoelectric machine associated therewith;

a means for processing the measured electrical characteristics to create a load profile presented by the application to the energy system; and a means for dynamically controlling the charging of the energy system in accordance wit said load profile to a state of charge which is less than a maximum state of charge to provide headroom to permit said energy system to receive regenerative energy from said dynamoelectric machine.

20. The energy system of claim 19 wherein said measuring means includes a voltage monitoring device and a current monitoring device configured to sample a voltage level and a current level of the power drawn by the application at a predetermined rate of time to produce a series time-based measurements.

21. The energy system of claim 20 wherein said processing means includes a control processing unit (CPU) configured to store said series of time-based measurements and to determine a first energy spectra and a first power spectra of said series of time based measurements.

22. The energy system of claim 21 wherein said series of time-based measurements is a first series and, and wherein said processing means further includes said CPU to be configured to determine a second energy spectra and a second power spectra corresponding to a second series of time-based measurements.

23. The energy system of claim 22 wherein said controlling means includes said CPU being configured to assign a weighting factor to said second energy spectra and power spectra in order to thereby define an appropriate charging strategy.

* * * * *